United States Patent Office.

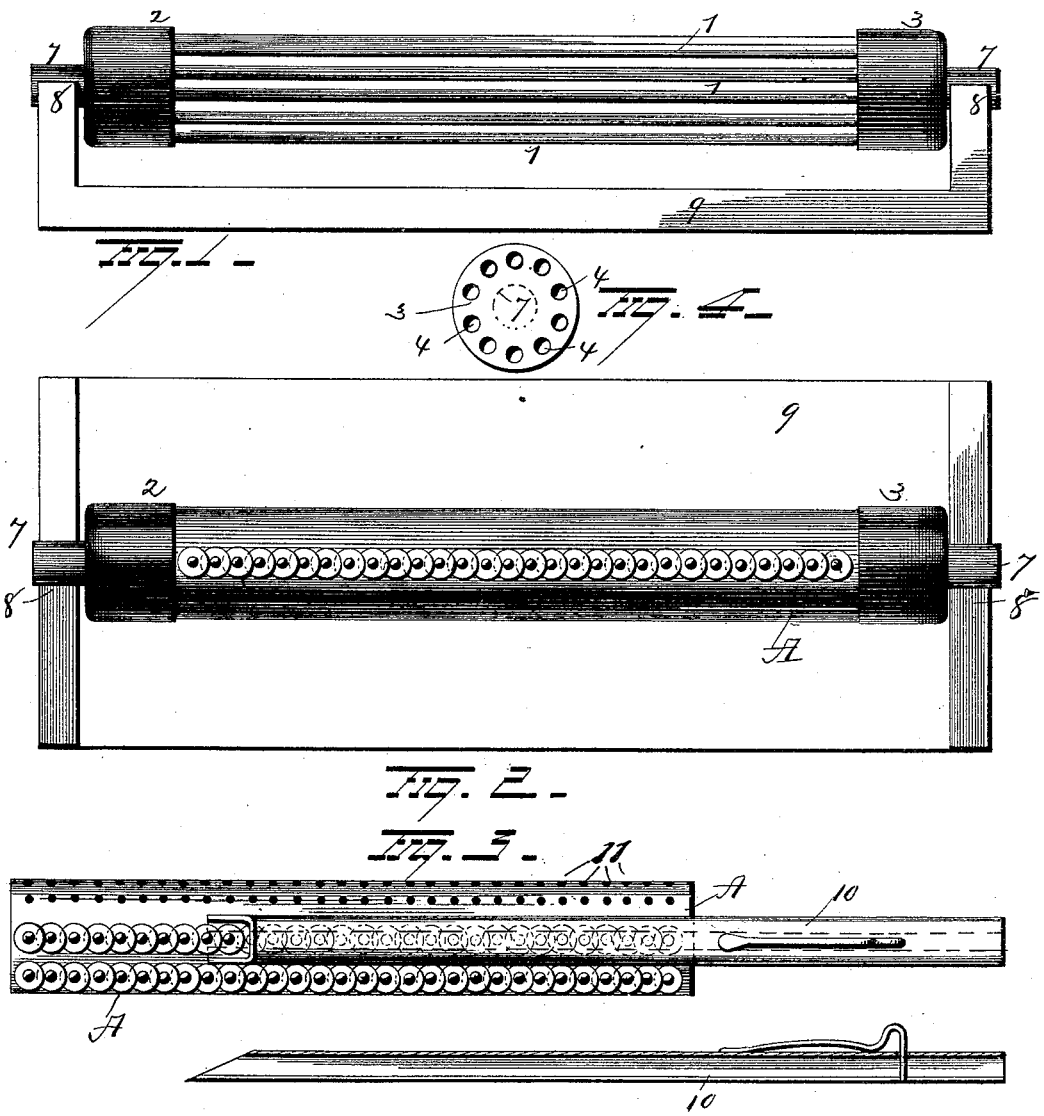

ALEXANDER G. WILKINS, OF MEADVILLE, PENNSYLVANIA, ASSIGNOR TO THE RAILWAY SPEED RECORDER COMPANY, OF KENT, OHIO.

HOLDER FOR SHOE-BUTTON FASTENERS.

SPECIFICATION forming part of Letters Patent No. 429,828, dated June 10, 1890.

Application filed August 6, 1889. Serial No. 319,905. (No model.)

*To all whom it may concern:*

Be it known that I, ALEXANDER G. WILKINS, of Meadville, in the county of Crawford and State of Pennsylvania, have invented certain new and useful Improvements in Holders for Shoe-Button Fasteners; and I do hereby declare the following to be a full, clear, and exact description of the invention, such as will enable others skilled in the art to which it appertains to make and use the same.

My invention relates to an improvement in holders for shoe-button fasteners and in means for facilitating the filling of such holders, the object being to produce a saving in labor and reduce the expenses attending the packing and transportation of shoe-fasteners and by so doing giving them a convenient arrangement, so that they may be quickly removed from the holder and fed to the machine in the same order that they are taken from the holder.

With this end in view my invention consists in certain novel features of construction and combinations of parts, as will be hereinafter described, and pointed out in the claims.

In the accompanying drawings, Figure 1 is a view of the reel and support or frame. Fig. 2 is a view of the same with the holder thereon. Fig. 3 shows the manner of removing the fasteners from the holder, and Fig. 4 is a view of the removable head of the reel.

A represents the holder, consisting, preferably, of a pasteboard tube or cylinder such as is generally used for sending articles through the mail. Of course any material may be used, but it has generally been found that paper, pasteboard, or card-board serves the purpose most advantageously. For convenience in filling this holder or tube, it is mounted on a suitable reel consisting of the rods 1 1, the ends of which are held in heads 2 and 3, in the former rigidly and in the latter removably. The holes 4 4 in the head 3 have enlarged outer ends to guide the rods or wires in entering them, and the object of making this head removable is to provide for putting the tube on the reel or removing it. The heads are sufficiently large to prevent end-play of the holder when placed on the tube, and when the holder is placed on the reel the whole has the appearance of a long spool, the rods being completely incased by the holder. The rods keep the holder in shape and furnish support for it while it is being filled. The heads are furnished on their outer ends with trunnions 7 7, and these are adapted to be supported and turn in V-shaped or other bearings 8 8 in the frame 9. The fasteners are forced through the tube between the rods or wires from end to end, thus forming a series of straight rows longitudinally of the tube, and to prevent any deviation from straight lines the tubes might be marked to indicate the positions to be taken by the fasteners, or the tube may be provided with a series of perforations, as shown in Fig. 3.

The fasteners may be easily inserted in the holders by children, and in inserting them they are preferably placed so that the washer of one laps over the adjacent edge of the next, and so on.

The rollers are filled in large quantities and shipped to the market, serving not only as a means for holding and carrying the goods, but also by being arranged as described they may be removed a row at a time into the feed-tube 10 of the machine. The tube is taken in one hand and slid beneath the heads or washers of the fasteners, or, if the feed-tube is stationary, the holder is removed in the same way. Then by simply pulling the holder and feeding-tube away from each other a tube full of fasteners is removed at a time from the holder.

It is evident that slight changes might be resorted to in the form and arrangement of the several parts described without departing from the spirit and scope of my invention, and hence I do not wish to limit myself to the particular construction herein set forth; but, Having fully described my invention, what I claim as new, and desire to secure by Letters Patent, is—

1. A device for packing button-fasteners, consisting of a reel and a tube placed on said reel and adapted to have fasteners inserted in the periphery thereof, substantially as set forth.

2. A device for packing button-fasteners, consisting of a reel composed of rods or wires, a fixed and a removable head, and a tube placed over the rods or wires and held thereon by the heads, substantially as set forth.

3. A device for packing button-fasteners, consisting of a reel composed of a pair of heads having holes therein, and rods held in said holes, and a pasteboard tubular holder held on said rod between the heads, substantially as set forth.

4. A device for packing button-fasteners, consisting of a frame, a reel revolubly supported thereon, said reel being made in detachable parts, and a tube or holder mounted on the reel and held thereon by the heads, substantially as set forth.

5. A button-fastener package comprising an elongated tube having perforations arranged in rows lengthwise the tube, and button-fasteners inserted in said perforations with their points within the tube and their heads overlapping, substantially as set forth.

In testimony whereof I have signed this specification in the presence of two subscribing witnesses.

ALEXANDER G. WILKINS.

Witnesses:
MILES W. TATE,
A. K. CARMICHAEL.